July 12, 1966 E. R. WEYER 3,259,987

RECORDING TAPE DEVICE

Filed Aug. 6, 1964 2 Sheets-Sheet 1

Inventor: Elliott R. Weyer

July 12, 1966 E. R. WEYER 3,259,987

RECORDING TAPE DEVICE

Filed Aug. 6, 1964 2 Sheets-Sheet 2

United States Patent Office 3,259,987

Patented July 12, 1966

3,259,987
RECORDING TAPE DEVICE

Elliott R. Weyer, New York, N.Y.
(West Hills Road, Ivoryton, Conn.)

Filed Aug. 6, 1964, Ser. No. 387,834
2 Claims. (Cl. 33—128)

This invention relates to improvements in a device to indicate instantly and accurately the recording or playback time of a given amount of magnetic recording tape wound on a reel without prior knowledge of the footage of the tape. Obviously the devices of the instant invention may be used to estimate footage of tape as well as its transport time.

Tape reels commonly available are of various sizes ranging from 3″ to 14″ in diameter; and the length of tape which a given reel will accommodate depends not only on the outside diameter of the reel but upon the hub which may vary in size independently. While footage of tape is usually specified when a reel is offered in the market, and while the record/playback time at the several customary transport speeds may readily be calculated from footage, the editing techniques of cutting and splicing are bound eventually to alter the transport time of the reel content.

It is one object of the instant invention to enable direct estimation of the transport time of any given amount of tape wound on a reel of any size, even while the tape is in motion. Further, these devices predict transport time of any given amount of tape whether it be at the hub, at the periphery, or at an intermediate position on the reel. The invention is useful also in locating specific items recorded on a reel of tape.

Assuming a standard tape thickness and a standard transport speed, such devices are direct-reading and give at once the desired figure in minutes of record or play time; or, tape length in feet is available if that dimension is desired. Most important, any of these values become available instantly without any measuring or computation on the part of the operator.

It is readily possible to adapt embodiments of this invention to take into account the various tape base thicknesses and transport speeds; however, in the interest of simplicity of presentation, the discussion here will deal with 1½ mil tape (base gauge) and a transport speed of 3¾ inches per second.

It is obvious that for tape of any uniform thickness traveling at a constant speed, record/playback time is directly proportional to the area of the annulus formed by the presenting edge of the tape on the reel. The area of an annulus may be calculated from the formula:

$$\text{Area}=\pi(r_0^2-r_i^2)$$

where $r_0$ is the outside radius of the annulus, and $r_i$ is the inside radius of the annulus. The resulting value for area may be converted directly to a figure denoting minutes by multiplying by the appropriate factor. The device to be disclosed herein in detail, in effect, computes automatically the area of the annulus of tape and in the same operation, converts area into minutes of record or play.

While the calibration of devices of this invention (i.e., construction of the minutes or footage scale) may be done mathematically, I have found it simpler and more practical to enter the reference points on the scale during the timed transport of tape of standard, uniform gauge and at standard, constant speed. The device will thereafter be accurate in its broad applications so long as it is used in connection with tape of the same thickness traveling at the original speed. Simple factors can be used to convert the figures of a time scale to values for other tape thicknesses (such as "double play," ½ mil tape); likewise simple factors can be used when switching to another tape transport speed.

To avoid the necessity of the above-mentioned factors, it is readily possible to provide an additional scale or scales, on the reverse side of the device below the first scale.

The formula for the area of the annulus has already been referred to. It is appropriate to mention also the derivation of annulus inner and outer circumferences, each equal to $2\pi r$, $r$ equaling the inner or outer radius as the case may be. The mean circumference (inner circumference plus outer circumference divided by two), when multiplied by the number of tape turns within the annulus gives total length of tape within said annulus; and this figure, in inches, when divided by tape speed in inches per second, gives total transport time of all of the tape of the annulus in seconds.

Number of turns of tape in a given annulus may be counted as the reel turns in transport, or it may be quite accurately estimated from micrometer measurement of the "thickness" of the annulus, bearing in mind that the so-called "1½ mil tape" is actually 2.0 mils thick. Thus, 250 turns of 1½ mil tape will probably show a thickness of one-half inch ($250\times0.002=0.5$). With the advent of new tape thicknesses arising from new plastic bases and new oxide coatings and techniques, it is recommended that calibration of the devices of this invention be undertaken as suggested earlier, by entering reference points upon the scale during timed transport of the particular type of tape with which the device will be used thereafter.

The principles involved in the instant invention as well as the actual devices illustrated may readily be applied to the measurement of footage of e.g., motion picture film on a reel. "Viewing time" may also be shown on the scale. Such applications of the invvention are so obvious that they will not be discussed here.

Referring now to the drawings:

FIGURE 3 shows the plan of a simplified form of the device of FIGURE 2, modified for construction of an opaque material such as vulcanized fibre, cardboard and the like.

Figures 3, 4:
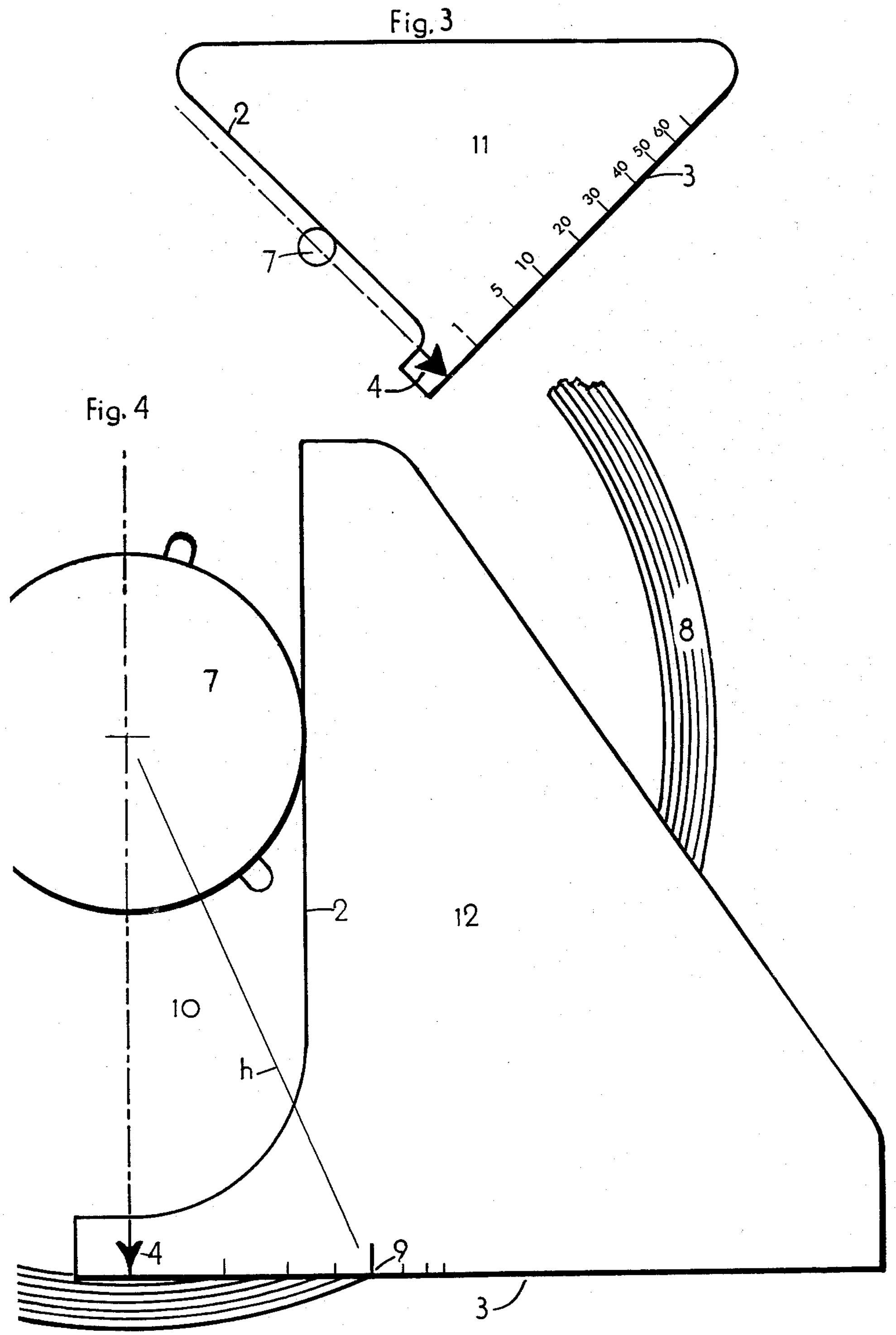

FIGURE 4 presents the layout of the device of larger dimensions for use with reels fitting the larger spindles (the 10½″ and 14″ reels). Shown also in FIGURE 4 is the 3″ spindle of a tape transport mechanism for the larger reels; included also is an annulus of recording tape as being measured by said device for transport-time, or for physical length of the tape helically composing the annulus.

Figure 1:
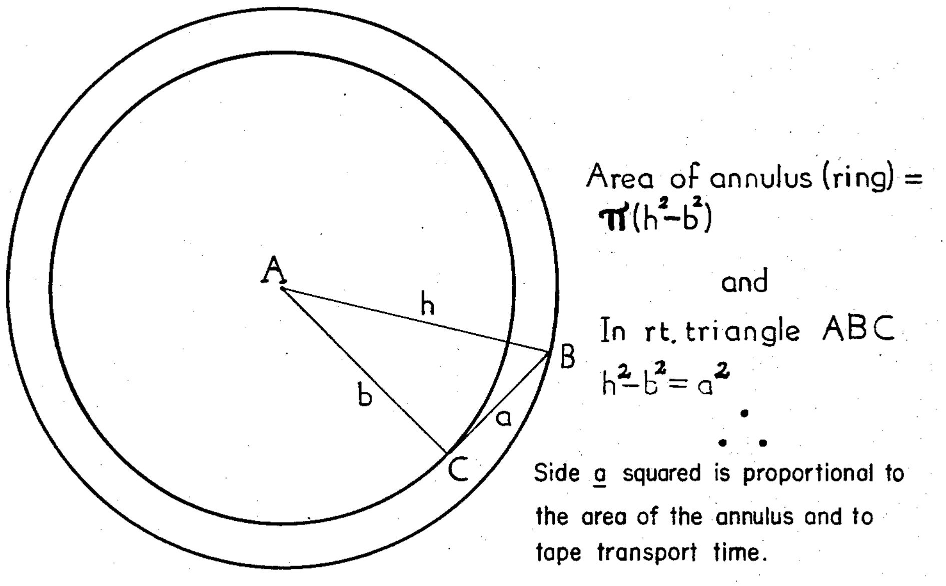
FIGURE 1 shows an annulus (ring) with a superimposed right angle triangle, two sides of which correspond respectively with the inside and outside radii of the annulus. To the right are inscribed the formulas for the area of an annulus and for the geometrical relationship which characterizes a right angle triangle.

Returning now to a consideration of FIGURE 1, the angular relationship between the outside and inside radii of the annulus (at point A) has been purposely established so that the connecting line $a$, forms a right angle with the inner radius $b$, at point C. The similarity of the formulas inscribed at the right discloses the geometric basis upon which the area of an annulus is related to the length of side $a$ of triangle ACB.

Figure 2:
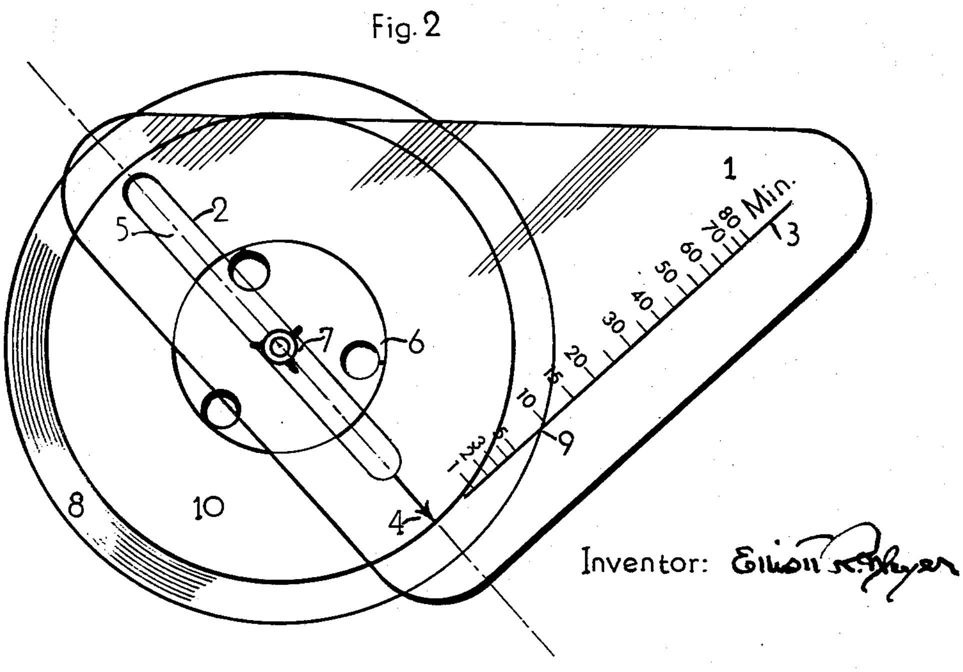
FIG. 2 shows the plan of an embodiment of the instant invention while in use, that is, superimposed in planar contact with a 7″ reel wound with magnetic tape, said reel being supported upon the spindle of a tape transport mechanism.

The device of FIGURE 2 is simply constructed of transparent plastic sheet, e.g. 20 mil cellulose acetate, roughly triangular in shape, 1 in FIGURE 2. Three distinct features are essential to the device: (1) The straightedge 2, (2) the measuring scale baseline 3 (same being at right angles with straightedge 2), and (3), index (arrow) 4 which lies on the center line of the spindle and is so positioned that its point just touches an extension of the base line of the scale (at the zero point).

The interrelationship among the three essential elements mentioned above, and in turn, with the configuration of the right angle triangle of FIGURE 1, is self-evident.

Slot 5 of the device of FIGURE 2 is to assure intimate tangential contact of straightedge 2 with spindle 7. As will be noted in connection with the device of FIGURE 3, said slot is not functionally necessary so long as tangential contact between straightedge 2 and spindle 7 are manually maintained during use of the device. Elimination of the slot may decrease construction costs materially.

The layout in FIGURE 3 pertains to a device constructed of vulcanized fibre, cardboard or other opaque material in which the lower edge of the device must terminate at the scale base line in order that the tape annulus beneath may remain visible, particularly at the exact point where the outer circumference of the tape annulus intersects the scale base line, as this is the point at which the scale is read for time in minutes or tape length in feet, 9 in FIGURES 2, 3 and 4. Likewise in these three figures, the straightedge member, the scale base line and the index have uniformity in the numbers designating same respectively.

FIGURE 4 shows the layout of an embodiment of the invention scaled for use on the two larger reel sizes, i.e., reel sizes of 10½" and 14" respectively. These reels differ in having a central aperture 3" in diameter to accommodate a spindle diameter of that size.

It will now be noted that the index (arrow) 4 must be displaced farther from spindle center line to adjust for the larger spindle diameter. Whereas spindle diameter for reels up to and including those of 7" in diameter, is 5⁄16", necessitating the displacement of the index arrow 5⁄32" from the spindle center line, for the larger reels it becomes necessary to displace said index arrow, 1½" from straightedge 2. Thus, it is a general rule to construct in such manner that the straightedge is one-half spindle diameter from spindle center line.

In FIGURES 2 and 4, the area designated as 10 denotes tape area adjacent to reel hub and not being measured as is the annulus 8, in each case.

The use of the devices of the invention is very simple. Index arrow is free to move radially from the center of the spindle to demarcate the inside diameter of the annulus of tape to be timed or measured—keeping straightedge 2 in firm contact with the spindle. Point where the outside diameter of said annulus intersects the scale base line indicates on said scale the desired value.

The small devices of FIGURES 2 and 3 need be no larger than 5" in length along their longest side yet are capable of accurate measurements of transport time or tape length on reels up to and including 7" in diameter, even when said reels are wound beyond normal capacity. For the larger reels with spindle aperture 3" in diameter, a straightedge length of 7" and a scale base line of 7" are suggested as adequate.

In FIGURE 4, the hypotenuse, *h*, is drawn to re-emphasize the right angle triangle which justifies and explains the underlying principle of this invention.

All figures were originally drawn in scale 1:1, i.e. in natural size.

I claim:

1. A device for estimating the transport time of tape on a hub which is adapted to be mounted on a spindle, which comprises a transparent plate-like element having a straightedge, a base line marked on the plate-like element and arranged at right angles to the straightedge, said base line being marked and calibrated to constitute a time scale; the base line being provided with a zero index which is spaced a measured distance from the intersection of the loci of points of the straightedge and the base line, said measured distance being equal to one-half of the diameter of the spindle.

2. A device for estimating the transport time of tape on a hub which is adapted to be mounted on a spindle, which comprises a plate-like element having a straightedge, a base line marked along one edge of the plate-like element and arranged at right angles to the straightedge, said base line being marked and calibrated to constitute a time scale; the base line being provided with a zero index which is spaced at a measured distance from the intersection of the loci of points of the straightedge and the base line, said measured distance being equal to one-half of the diameter of the spindle.

References Cited by the Examiner

UNITED STATES PATENTS

| | | | |
|---|---|---|---|
| 1,619,427 | 3/1927 | McCaffery | 33—104 |
| 1,685,904 | 10/1928 | Burke | 33—128 |
| 2,912,763 | 11/1959 | Loewe et al. | 33—128 |
| 3,173,212 | 3/1965 | Fredrickson | 33—111 |

LEONARD FORMAN, *Primary Examiner.*

ISAAC LISANN, *Examiner.*

H. N. HAROIAN, *Assistant Examiner.*